(12) United States Patent
Tong et al.

(10) Patent No.: US 12,050,687 B1
(45) Date of Patent: Jul. 30, 2024

(54) SYSTEMS AND METHODS FOR MALWARE DETECTION IN PORTABLE EXECUTABLE FILES

(71) Applicant: Morgan Stanley Services Group Inc., New York, NY (US)

(72) Inventors: Chenggang Tong, Singapore (SG); Fan Liu, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/410,625

(22) Filed: Jan. 11, 2024

(51) Int. Cl.
*G06F 21/56* (2013.01)
*G06F 8/53* (2018.01)
*G06F 9/445* (2018.01)

(52) U.S. Cl.
CPC .......... *G06F 21/566* (2013.01); *G06F 21/565* (2013.01); *G06F 8/53* (2013.01); *G06F 9/44589* (2013.01); *G06F 2221/034* (2013.01)

(58) Field of Classification Search
CPC ........ G06F 21/566; G06F 21/565; G06F 8/53; G06F 9/44589; G06F 2221/034
See application file for complete search history.

(56) References Cited

U.S. PATENT DOCUMENTS

| | | | |
|---|---|---|---|
| 9,213,838 B2 * | 12/2015 | Lu | G06F 21/552 |
| 9,594,904 B1 * | 3/2017 | Jain | G06F 21/563 |
| 10,007,789 B2 | 6/2018 | Kim et al. | |
| 10,033,747 B1 | 7/2018 | Paithane et al. | |
| 10,083,298 B1 * | 9/2018 | Krishnappa | G06F 21/563 |
| 11,354,409 B1 * | 6/2022 | Kenefick | G06F 21/51 |
| 2008/0263669 A1 | 10/2008 | Alme | |
| 2012/0317644 A1 | 12/2012 | Kumar et al. | |
| 2016/0057159 A1 * | 2/2016 | Yin | H04L 63/145 726/23 |
| 2019/0114417 A1 * | 4/2019 | Subbarayan | H04L 41/145 |
| 2020/0250015 A1 * | 8/2020 | Zhi | G06F 16/9566 |
| 2021/0141897 A1 | 5/2021 | Seifert et al. | |
| 2021/0374241 A1 | 12/2021 | Parikh et al. | |
| 2022/0083661 A1 | 3/2022 | Ma et al. | |
| 2022/0129564 A1 * | 4/2022 | Hecht | G06F 21/53 |
| 2023/0367516 A1 * | 11/2023 | Zhang | G06F 3/0673 |
| 2024/0007492 A1 * | 1/2024 | Shen | H04L 63/1425 |

FOREIGN PATENT DOCUMENTS

| | | | | |
|---|---|---|---|---|
| CN | 107908963 | | 4/2018 | |
| CN | 109543410 | | 3/2019 | |
| WO | WO-2006006144 A2 * | 1/2006 | ........... | G06F 21/563 |

OTHER PUBLICATIONS

Chen et al., Malware Classification Using Static Disassembly and Machine Learning, arXiv:2201.07649v1, [cs.CR] dated Dec. 10, 2021, 9 pages.

* cited by examiner

*Primary Examiner* — Christopher A Revak
(74) *Attorney, Agent, or Firm* — PEARL COHEN ZEDEK LATZER BARATZ LLP (57) ABSTRACT

A system and method for detecting malware in portable executable (PE) files is provided. The system and method can include receiving a PE file, parsing the PE file to filter known malware, decompiling the filtered PE file into assembly code and/or p-code, extracting all API call sequences from the p-code, for all API call sequences that match a stored API call sequence, and/or identify the corresponding PE file as malware.

12 Claims, 6 Drawing Sheets

SYSTEMS AND METHODS FOR MALWARE DETECTION IN PORTABLE EXECUTABLE FILES

FIELD OF THE INVENTION

The invention relates generally systems and method for malware detection in portable executable (PE) files. In particular, to systems and method for malware detection with PE file API call sequences with P-code emulation.

BACKGROUND

In current cyber landscape, Endpoint Detection and Response (EDR) solutions and anti-virus engines can observe tons of unknown PE files every day. Trusted or unknown third-party vendor applications that can be particular to Windows platform can also introduce potential cyber risk.

Currently each PE file is manually analyzed to verify whether or not it contains malicious activities after alerts by detection engines and/or requested by regulations. Analyzing each PE files can require deep technical expertise and/or be time consuming. For systems that receive thousands of PE files, it is unrealistic to manually analyze the PE files for malware.

SUMMARY OF THE INVENTION

One advantage of the invention can be an ability to automatically determine whether malicious behaviors exist in received PE files. Other advantages of the invention can include a higher accuracy than traditional simple signatures (e.g., like string matching and/or regex matching) and/or fewer resources can be needed than sandbox analysis and/or machine learning methods.

In one aspect, the invention involves a method for detecting malware in portable executable (PE) files. The method involves receiving, by a server, a PE file. The method also involves parsing, by the server, the PE file to filter known malware. The method also involves decompiling, by the server, the filtered PE file into assembly code, p-code or any combination thereof. The method also involves extracting, by the server, all API call sequences from the p-code. The method also involves for all API call sequences that match a stored API call sequence, identify, by the server, the corresponding PE file as malware.

In some embodiments, extracting also involves identifying all API calls and their corresponding name, that can be used by non-malware and malware executables in the assembly code, p-code or any combination thereof, and for each identified API call locating variables that are context parameters for the identified API call, wherein the context is whether the particular API call depends on one or more API calls before or after it in its correspondence API sequence, for the current API call, analyzing forward API call data and backward API call data based on the context to locate next and previous API calls, respectively, to locate each API call to be included in a single API call sequence, and aggregate all the single API call sequences for each identified API call into the all API call sequences.

In some embodiments, analyzing the backward API call data is based on p-code instruction type of the API call of the data. In some embodiments, extracting the API call sequences further comprises determining a name for each API call in each API call sequence. In some embodiments, extracting the API call sequences further comprises determining a hash of each API name for each API call in each API call sequence.

In some embodiments, determining whether each API sequence that does not match a stored API call sequence is malware and if so, adding it to the stored API sequences. In some embodiments, parsing the PE file is further based on reputation and open CTI signatures.

In another aspect, the invention includes one or more non-transitory computer-readable storage media comprising instructions that are executable to cause one or more processors to receive a PE file, parse the PE file to filter known malware, decompile the filtered PE file into assembly code, p-code or any combination thereof, extract all API call sequences from the p-code, for all API call sequences that match a stored API call sequence, identify the corresponding PE file as malware.

In some embodiments, the extracting further causes the one or more processors to identify all API calls and their corresponding name, that can be used by non-malware and malware executables in the assembly code, p-code or any combination thereof and for each identified API call, locate variables that are context parameters for the identified API call, wherein the context is whether the particular API call depends on one or more API calls before or after it in its correspondence API sequence, for the current API call, analyze forward API call data and backward API call data based on the context to locate next and previous API calls, respectively, to locate each API call to be included in a single API call sequence, and aggregate all the single API call sequences for each identified API call into the all API call sequences.

In some embodiments, analyzing the backward API call data is based on p-code instruction type of the API call of the data. In some embodiments, the extracting further causes the one or more processors to determining a name for each API call in each API call sequence.

In some embodiments, the extracting further causes the one or more processors to determining a hash of each API name for each API call in each API call sequence. In some embodiments, the instructions when executed further cause the one or more processors to determine whether each API sequence that does not match a stored API call sequence is malware and if so, adding it to the stored API sequences.

In some embodiments, the instructions when executed further cause the one or more processors to parsing the PE file is further based on reputation and open CTI signatures.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

Figure 1:
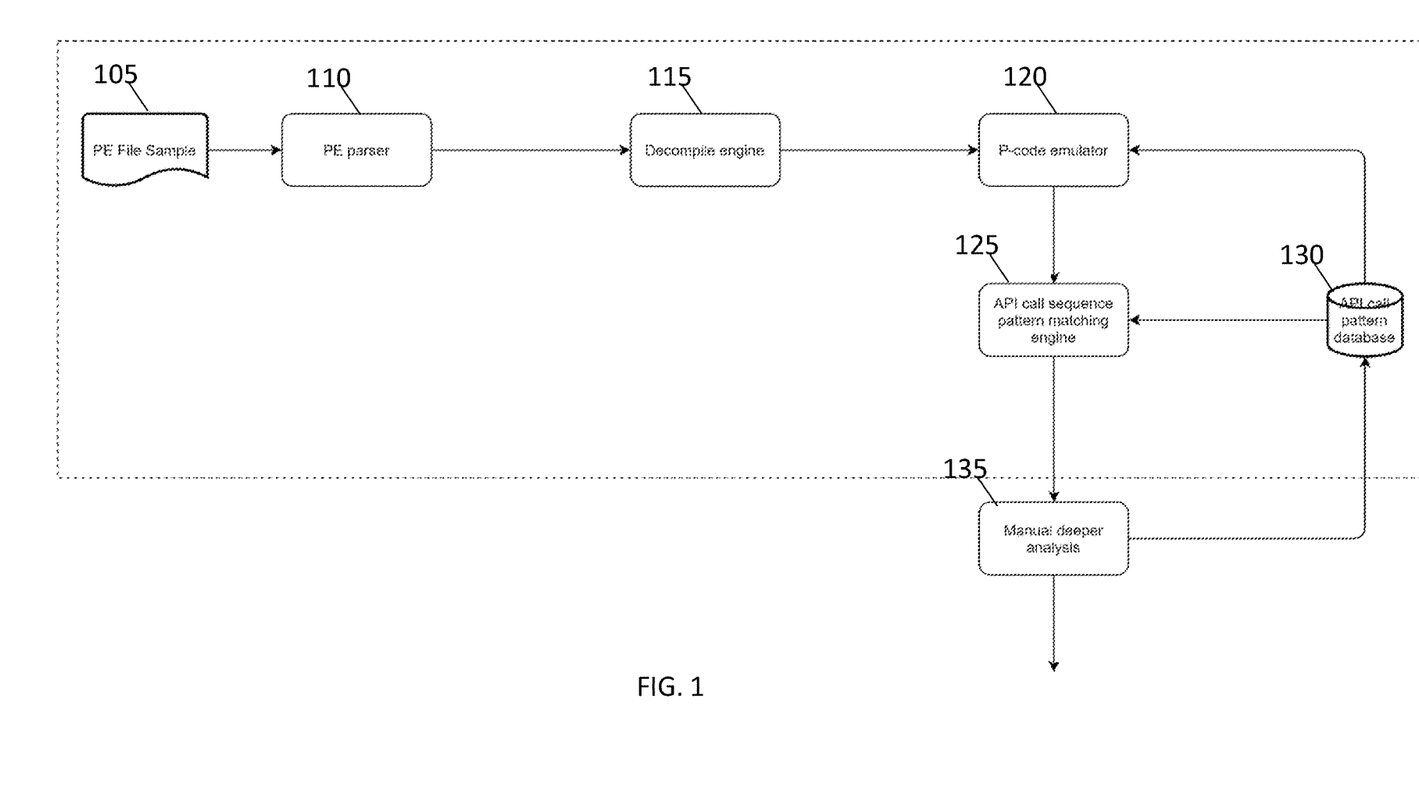
FIG. 1 is a system architecture diagram of a system for detecting malware in portable executable (PE) files, according to some embodiments of the invention.

FIG. 1 is a system architecture diagram of a system for detecting malware in portable executable (PE) files, according to some embodiments of the invention.

The system architecture can include a PE parser 110, a decompile engine 115, a P-code emulator 120, an API call sequence pattern matching engine 125 and an API call pattern database 130.

The PE parser 110 can parse received PE files 105, for example, from daily alerts generated by cybersecurity monitoring devices and/or services, and/or from vendors who provide software to support daily businesses. The PE parser 110 can filter out known malware from PE files 105 to focus analysis of the PE files on the malware without known signatures. The PE parser 110 can communicate with the decompile engine 115.

The decompile engine 115 can receive the filtered PE files from the PE parser 110. The decompile engine 115 can decompile the PE file into assembly code and pseudo code (e.g., P-code) for emulation. The decompile engine 115 can decompile based on existing assembly language from various CPU platforms. The decompile engine 115 can communicate with the PE parser 110 and the P-code emulator 120.

The P-code emulator 120 can receive the decompiled filtered PE files, e.g., the assembly code and/or P-code from the decompile engine 115. The P-code emulator 120 can process the assembly code and the P-code to extract API call sequences. In some embodiments, the input is API name hash patterns, the P-code emulator 120 can be extracted. The API name hash can be generated by algorithms which transfer API name strings into 4 bytes integer. The P-code emulator 120 can communicate with the decompile engine 115 and the API call sequence pattern matching engine 125.

The API call sequence pattern matching engine 125 can receive the extracted API call sequences from the P-code emulator. The API call sequence pattern matching engine 125 can match the extracted API call sequences against the API call sequence patterns stored in the API call pattern database 130. The API call pattern database 130 can store API call sequences and/or API name hash patterns that are known.

The PE parser 110, the decompile engine 115, the P-code emulator 120 and/or the API call sequence pattern matching engine 125 can each be on their own server (e.g., computing device), on the same server, or any combination of servers.

In some embodiments, the P-code emulator 120 recognizes API call sequences that are Window Crypto API decrypting sequence.

The API call sequence patterns that are stored in the API call pattern database 130 can include an API name, API parameters, highlighted API context parameters and/or API data parameters. The API data parameters include a type of API parameter containing potential malicious content. The potential malicious content contained in data parameters can be used or executed in the succeeding code. For example, a fifth parameter "*pbData" of an API CryptDecrypt API call sequence, encrypted shellcode can be sent to the API for decryption and called later. The API context parameter can be parameters that are based on operation system SDK defined API parameters which can provide API call environmental context data within an operation system.

The API call sequence patterns that are stored in the API call pattern database 130 can include pre-requisite API names and succeeding API names. The pre-requisite API names and succeeding API names can include APIs which generate, update, and/or use context parameters before and/or after a certain API to be focused on. For example, the pre-requisite API names of "CryptDecrypt" are CryptAcquireContext, CryptImportKey, CryptCreateHash, CryptHashData, CryptDeriveKey, the succeeding API names of "CryptDecrypt" are CryptDestroyHash, CryptDestroy Key, CryptReleaseContext.

The API call sequence patterns that are stored in the API call pattern database 130 can include API name hash patterns which are generated by known API name hash algorithms. For example, API name CryptDecrypt is hashed into 0x59202584 by ROR13 algorithm.

The API call sequence patterns that are stored in the API call pattern database 130 can include an API name list which is sorted in sequences by the definition of operation system SDK and generalized common malicious utilization.

Each time a new API call sequence pattern is identified, the database can be updated.

When the API call sequence pattern is not matched, a manual analysis 135 can be performed. Upon performing the manual analysis 135, the identified API call sequence pattern can be added into the API call pattern database 130.

Figure 2:
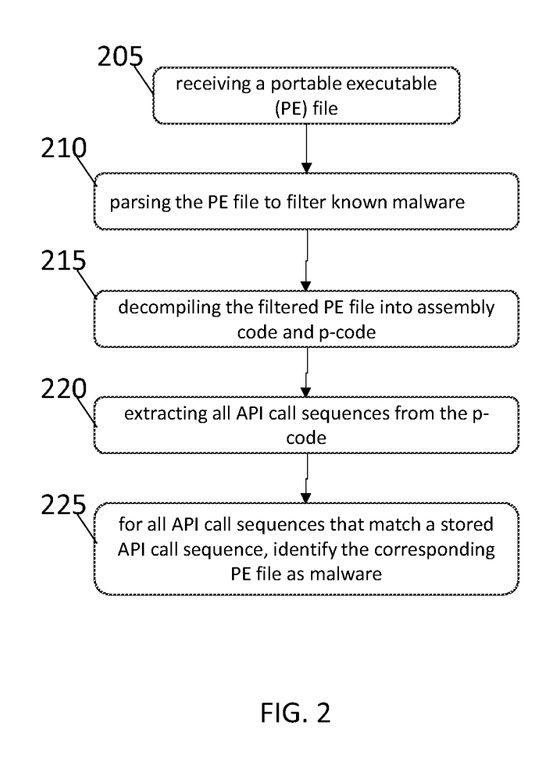
FIG. 2 is a flow diagram of a method for detecting malware in portable executable (PE) files, according to some embodiments of the invention.

FIG. 2 is a flow diagram of a method for detecting malware in portable executable (PE) files, according to some embodiments of the invention.

The method can involve receiving (e.g., by a PE parser 110, as described above in FIG. 1) a PE file (Step 205).

The method can involve receiving parsing (e.g., by the PE parser 110, as described above in FIG. 1) the PE file to filter known malware (Step 210). The PE file can be filtered based on reputation and/or open CTI signatures.

The reputation can be from third party intelligence, for example, open services or paid services that are provided on the internet to check for known file reputations, for example, VirusTotal.

The method can involve decompiling (e.g., by the decompile engine 115, as described above in FIG. 1) the filtered PE file into assembly code and psuedocode (e.g., P-code) (Step 215). In some embodiments, a decompile engine can be used. For example, IDA pro, Ghidra, and/or any tool as is known in the art.

The method can involve extracting (e.g., by the P-code emulator 120, as described above in FIG. 1) all API call sequences from the P-code (Step 220). Extracting the API call sequences from the P-code can be done as shown below in FIG. 3.

The method can involve for all API call sequences that match a stored API call sequence, identify (e.g., by the API call sequence pattern matching engine 125, as described above in FIG. 1) the corresponding PE file as malware (Step 225).

Figure 3:
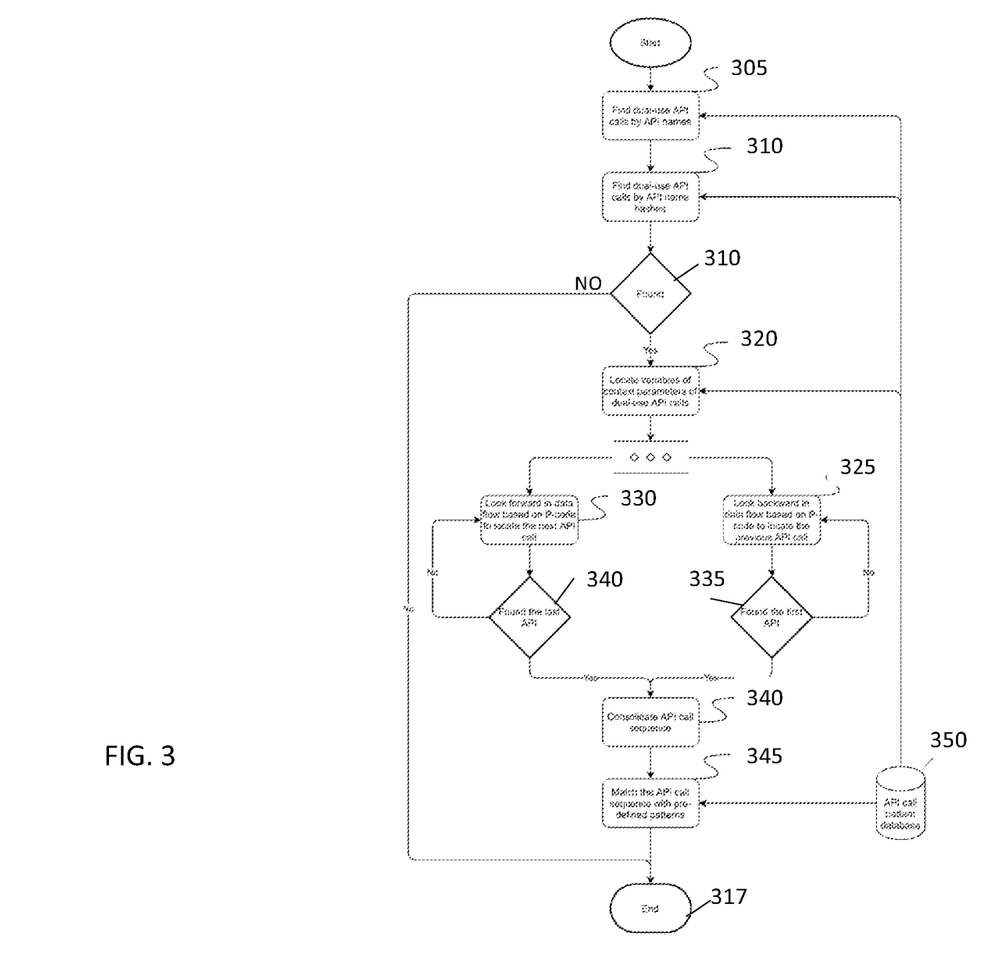
FIG. 3 is a flow chart for a method extracting all API call sequences from the P-code, according to some embodiments of the invention.

FIG. 3 is a flow chart for a method extracting all API call sequences from the P-code (e.g., via the P-code emulator 120 as described above in FIG. 1), according to some embodiments of the invention.

The method involves finding a dual-use API call by API name in received API calls (Step 305). The dual-use API calls can be operating system defined API calls which can be used both in malware and benign software. Known dual-use API calls can be stored in the API call pattern database 130 as described above in FIG. 1. The dual-use API call names stored in the API call pattern database can be compared against API call names retrieved from the PE file (e.g., as described above in FIG. 2), and against an invoked API list to find the dual-use APIs that are in the received PE file. The invoked API list can be generated from the decompiled assembly code (e.g., as decompiled by the decompile engine 115 as described above in FIG. 1), which can include the name of APIs being activated by the PE file. In some embodiments, the PE files can invoke a part of the imported APIs (e.g., features imported from other PE files), and an invoked API list can be a subset of the imported APIs.

The method involves finding dual-use API call by API name hashes (Step 310).

The API name hashes can be generated from known API names that can be used to hide the actual API names imported and invoked by PE files by malware writers. When embedded in a PE file, the API name hash can appear as 4 byte integers in decompiled assembly code, which can be discovered through comparing with known API name hashes stored in API call pattern database. For example, API name CryptDecrypt can be hashed into 0x59202584 by ROR13 algorithm, this 0x59202584 can be stored together with the string "CryptDecrypt" in the pattern database so that when matching, 0x59202584 directly links to "CryptDecrypt".

If no dual-use API calls are found (Step 310), then the method can end (Step 317).

If dual-use API calls are found (Step 310), then the method can involve locating variables of context parameters of the dual-use API calls (Step 320). Locating variables of context parameters can include extracting one or more context parameters based on known API definitions, known function calling conventions and/or P-code emulator (e.g., P-code emulator as described above in FIG. 1). API definitions can be documented in an operating systems software development kit (SDK). The function calling conventions can be methods as are known in the art, for example, fastcall, cdecl, stdcall, and/or other known methods. The P-code emulator can identify all of the parameters at P-code level linking to each of the API calls.

The context parameters can be stored in an API call pattern database (e.g., as described above in FIG. 1) with its corresponding API and/or represented by parameter ordinals. For example, assume one API call has 6 parameters, and a context parameter is at the 1st ordinal place. In this example, after obtaining parameters via the P-code emulator, the context parameter can be located based on parameter ordinals defined in API call pattern database.

The method can involve for each API call tracking backward (Step 325) and tracking forward (Step 330) in order to identify context parameters in both the backward and forward directions in the execution. Tracking backward (Step 325) can involve using the P-code to move backwards to locate the previous API call until the first API call in the sequence is reached (Step 335). Tracing backward in data flow by using the P-code emulator can confirm the necessary pre-requisition APIs are called before PE files invoke dual-use APIs. This helps to confirm PE files really invoke dual-use APIs, instead of a distraction intended to deter reverse engineering and malware analysis. Also, tracing backward for the context parameter dataflow can link all necessary APIs and verify the validity of API call sequences. For example, some API call sequences can involve API calls that are mandatory. In these sequences, if one or more of the mandatory API calls are missing, it can indicate that the API call sequences are not complete and/or are not valid. In some scenarios, PE files can import APIs but not use them. In these embodiments, the unused APIs can be identified in order to, for example, avoid false alarms.

For example, dual-use APIs can be used in malicious and benign files. It typically cannot be said that every PE file that uses dual-use APIs is malicious, such that additional information can be used. The additional information can include understand why the APIs are used. Finding pre-requisition APIs and succeeding APIs can be for this purpose.

To determine a malware is to understand the software behaviors' maliciousness, to understand behavior maliciousness, the program code semantics that define those behaviors can be determined. To know code semantics, understanding API call sequences can be used. Finding out API call sequences with tracking forward and backward on context parameter data flow based on P-code emulation can determine the behavior such that maliciousness can be determined.

The method can involve for each API call tracking forward (Step 330), can involve using the P-code to move forward to locate the succeeding API calls until the last API call in the sequence is reached (Step 340). Tracing forward in data flows based on P-code emulator is to confirm the necessary succeeding APIs are called after PE files invoke dual-use API. This can be to confirm PE files really invoke dual-use APIs, instead of a distraction intended to deter reverse engineering and malware analysis. Also, it can help to link all necessary APIs and verify the validity of API call sequences.

The method can involve consolidating all the API call sequences (Step 340). In this manner an entire API call sequence can be constructed for API call sequence pattern comparison.

The method can involve matching the consolidated API call sequence with the stored API call sequence (e.g., via the API call sequence matching engine as described above in FIG. 1) patterns in the API call pattern database (e.g., API call pattern database 130 as described above in FIG. 1).

Figure 4:
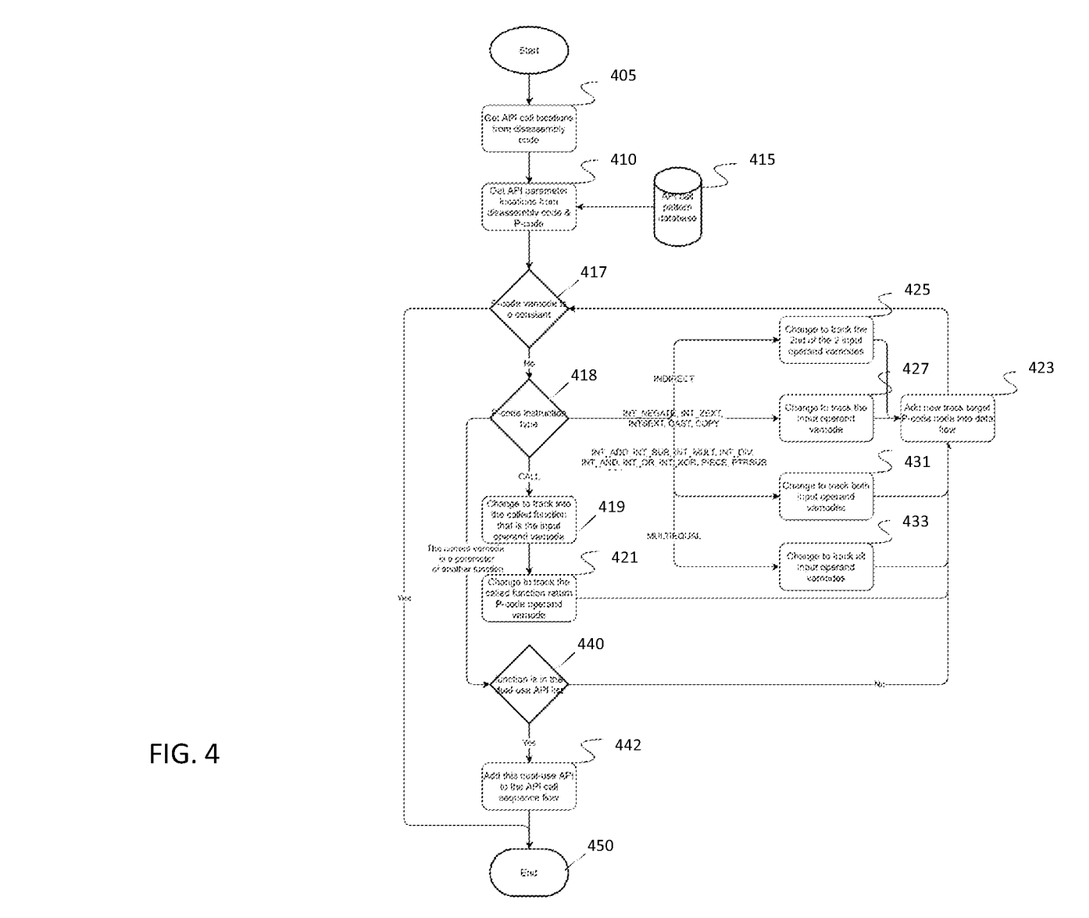
FIG. 4 is a flow chart of a method for tracking backwards via P-code emulation, according to some embodiments of the invention.

Tracking backwards via P-code emulation can be performed as shown in further detail in FIG. 4. FIG. 4 is a flow chart of a method for tracking backwards via P-code emulation, according to some embodiments of the invention.

The method can involve obtaining an API call location from assembly code that corresponds to the current API call (Step 405). For example, an API call location can be "0x04001234" for an example API call "CryptDecrypt." The API call location can be linked to the API parameter location, which can indicate the correct data flow tracking.

The method can involve obtaining an API parameter location for the API call from the assembly code and the P-code (Step 410). For example, an API parameter location can be "0x04001233" for an API parameter of "PUSH <parameter>." API parameters can be located in order to, for example, figure out the correct parameter assignment sequence and link the correct context data to have correct tracking.

The method can involve extracting one or more context parameters from the API call pattern database based on the current API call (Step 415). The context parameters can indicate which parameters in the API calls to track backwards.

If the P-code varnode is a constant (Step 417), then no other API calls have generated the API parameter, tracking ends (Step 450). If the P-code varnode is not constant (Step 417), then look backward to determine if the P-code instruction type is 1) a parameter of another function, 2) a call, or 3) not a constant but a variable.

Looking backward can involve determining a source of the context parameters. Typically, code execution is in a time sequence, for example, some code executed first then some code executed later. When reading code lines, tracking can be done backwards to determine a source of a variable.

For example, assume a piece of code: "A=B; C=A; and D=C", can be executed from the left to the right in time sequence. Also assume, D is the context parameter. In order to determine where the context parameter D is from, it can be seen in the example code, D is from C, however, data in C is from A, and the data in A is from B. Thus, in this example, tracking backward leads to B.

If the P-code instruction type (Step 418) is a parameter of another function, the method can involve checking if the function is one of the dual-use APIs (Step 440). If the function is a dual-use API, add the dual-use API to the API call sequence flow (Step 442).

If the P-code instruction type (Step 418) is a "CALL", the method can involve tracking into the called function that is the input operand varnode (Step 419). For example, a piece of code can be "x=f( ); api(x);", assume x is the context parameter, and API call "api(x)". The API call "api(x)" can be tracked back to find the source of x, to "f( )", since x is assigned by "f( )" before the "api(x)". The method can also involve changing to tracking the called function "f( )" "RETURN" P-code operand varnode (Step 421). Continuing with the example, after entering "f( )" at the P-code level, the "RETURN" instruction to track backward about which variable has assigned data to x can be found. Track into the called function "f( )" which returns P-code instruction operand varnode.

If the P-code instruction type (Step 418) is not a constant but a variable, determine which P-code instruction type. If the P-code instruction type (Step 418) is "INDIRECT", then move to the second of the two inputs operand varnodes (Step 425). For example, the "INDIRECT" instruction has 2 inputs and 1 output, then, "Output=Input1, Input2". Move here can cause the focus to change from the variable in the Output position to the Input2 position.

If the P-code instruction is one of "INT_NEGATE, INT_ZEXT, INTSEXT, CAST, COPY", move to track the input operand varnode (Step 427).

If the P-code instruction type (Step 418) is one of "INT_ADD, INT_SUB, INT_MULT, INT_DIV, INT_AND, INT_OR, INT_XOR, PIECE, PTRSUB", move to track both input operand varnodes (Step 431). If the P-code instruction type (Step 418) is "MULTIEQUAL", move to track all input operand varnodes) (Step 433).

The method can involve adding all tracked target P-codes into the data flow (Step 423). Continue back to Step 417.

Figure 5:
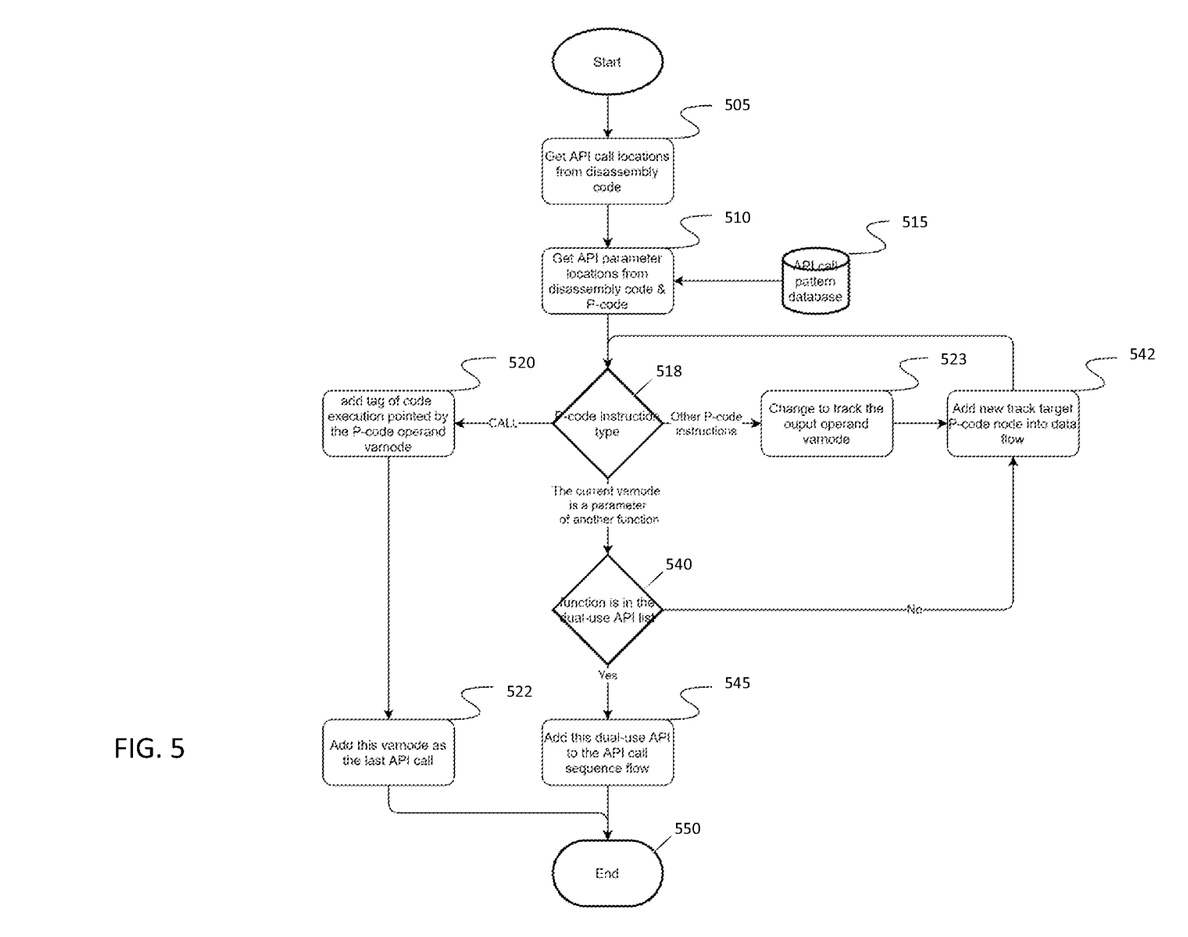
FIG. 5 is a flow chart of a method for tracking forward via P-code emulation, according to some embodiments of the invention.

Tracking forward via P-code emulation can be performed as shown in further detail in FIG. 5. FIG. 5 is a flow chart of a method for tracking forward via P-code emulation, according to some embodiments of the invention.

The method can involve obtaining the API call locations from the assembly code (Step 505).

The method can involve obtaining the API parameter locations from the assembly code and P-code (Step 510).

The method can involve extracting one or more context parameters from the API call pattern database based on the current API call (Step 515). The context parameters can indicate which parameters in the API calls to track forwards.

The method can involve determining if the P-code instruction type is 1) a parameter of another function, 2) a call, or 3) other P-code instructions.

If the P-code instruction type (Step 518) is a parameter of another function, the method can involve checking if the function is one of the dual-use APIs (Step 540). If the function is a dual-use API, add the dual-use API to the API call sequence flow (Step 545) and end (Step 550), otherwise, adding the new P-code to the data flow and continue tracking forward (Step 542).

If the P-code instruction type (Step 518) is "CALL", the parameter under tracking can be the input of the "CALL", add a tag to the code execution pointed to by the P-code operand varnode (Step 520) to highlight a direct call on a parameter under tracking. During typical operation, "CALL" can mean execute instructions in the target from the input of "CALL." The input of "CALL" should be an API address or address variables pointing to code lines. If "CALL" input is a data variable instead, this can indicate its suspicious activity as data variable is an unusual way to use the "CALL." A direct call on a parameter can indicate that the varnode is the last API call to complete the sequence, the method can involve adding the varnode as the last API call (Step 522), and ending (Step 550).

If the P-code instruction type (Step 518) is an other P-code instruction, then the method can involve tracking the output operand of the varnode (Step 523), and adding the new P-code to the data flow and continue tracking forward (Step 542).

Figure 6:
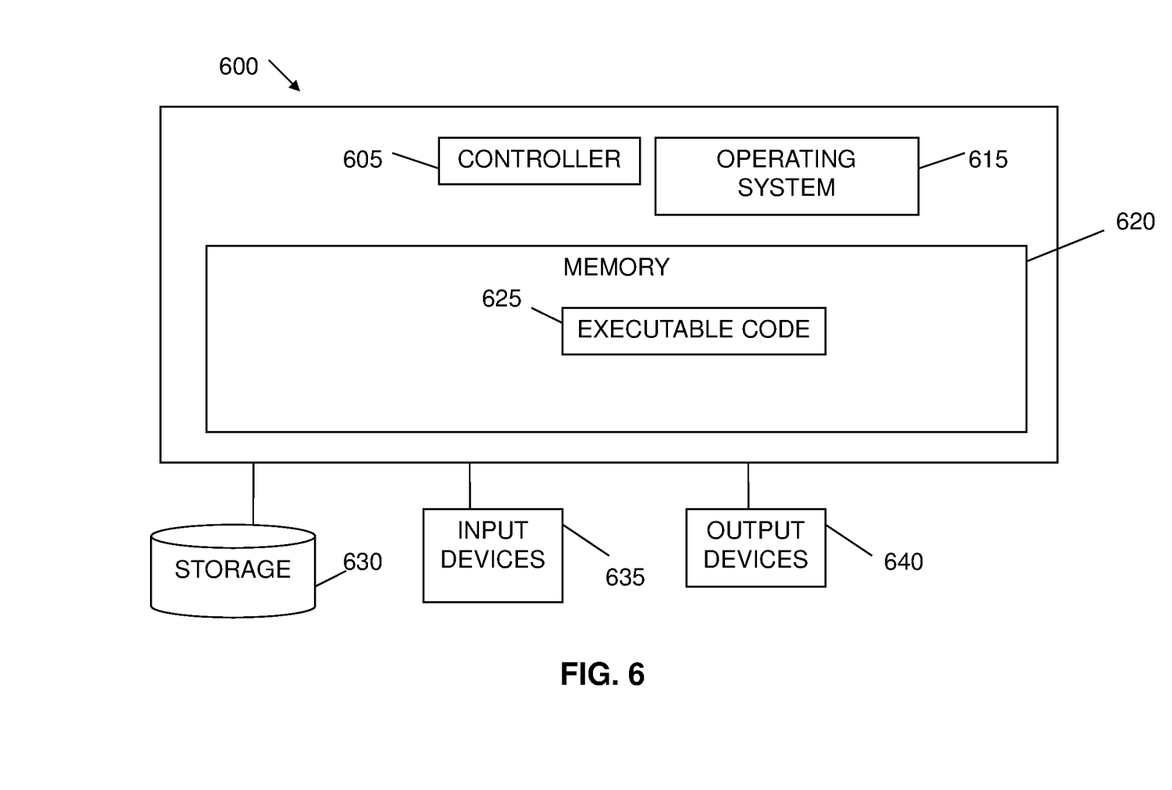
FIG. 6 shows a block diagram of a computing device 600 which can be used with embodiments of the invention.

FIG. 6 shows a block diagram of a computing device 600 which can be used with embodiments of the invention. Computing device 600 can include a controller or processor 605 that can be or include, for example, one or more central processing unit processor(s) (CPU), one or more Graphics Processing Unit(s) (GPU or GPGPU), a chip or any suitable computing or computational device, an operating system 615, a memory 620, a storage 630, input devices 635 and output devices 640.

Operating system 615 can be or can include any code segment designed and/or configured to perform tasks involving coordination, scheduling, arbitration, supervising, controlling or otherwise managing operation of computing device 600, for example, scheduling execution of programs. Memory 620 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 can be or can include a plurality of, possibly different memory units. Memory 620 can store for example, instructions to carry out a method (e.g. code 625), and/or data such as user responses, interruptions, etc.

Executable code 625 can be any executable code, e.g., an application, a program, a process, task or script. Executable code 625 can be executed by controller 605 possibly under control of operating system 615. For example, executable code 625 can when executed cause masking of personally identifiable information (PII), according to embodiments of the invention. In some embodiments, more than one computing device 600 or components of device 600 can be used for multiple functions described herein. For the various modules and functions described herein, one or more computing devices 600 or components of computing device 600 can be used. Devices that include components similar or different to those included in computing device 600 can be used, and can be connected to a network and used as a system. One or more processor(s) 605 can be configured to carry out embodiments of the invention by for example executing software or code. Storage 630 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 630 and can be loaded from storage 630 into a memory 620 where it can be processed by controller 605. In some embodiments, some of the components shown in FIG. 6 can be omitted.

Input devices 635 can be or can include for example a mouse, a keyboard, a touch screen or pad or any suitable input device. It will be recognized that any suitable number of input devices can be operatively connected to computing device 600 as shown by block 635. Output devices 640 can include one or more displays, speakers and/or any other suitable output devices. It will be recognized that any suitable number of output devices can be operatively connected to computing device 600 as shown by block 640. Any applicable input/output (I/O) devices can be connected to computing device 600, for example, a wired or wireless network interface card (NIC), a modem, printer or facsimile machine, a universal serial bus (USB) device or external hard drive can be included in input devices 635 and/or output devices 640.

Embodiments of the invention can include one or more article(s) (e.g. memory 620 or storage 630) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for detecting malware in portable executable (PE) files, the method comprising:
   receiving, by a server, a PE file;
   parsing, by the server, the PE file to filter known malware;
   decompiling, by the server, the filtered PE file into assembly code, p-code or any combination thereof;
   extracting, by the server, all API call sequences from the p-code; and
   for all API call sequences that match a stored API call sequence, identify, by the server, the corresponding PE file as malware,
   wherein extracting further comprises:
   identifying all API calls and their corresponding name, that can be used by non-malware and malware executables in the assembly code, p-code or any combination thereof;
   for each identified API call;
   locating variables that are context parameters for the identified API call, wherein the context is whether the particular API call depends on one or more API calls before or after it in its correspondence API sequence;
   for the current API call, analyzing forward API call data and backward API call data based on the context to locate next and previous API calls, respectively, to locate each API call to be included in a single API call sequence; and
   aggregate all the single API call sequences for each identified API call into the all API call sequences.

2. The method of claim 1 wherein analyzing the backward API call data is based on p-code instruction type of the API call of the data.

3. The method of claim 1 wherein extracting the API call sequences further comprises determining a name for each API call in each API call sequence.

4. The method of claim 1 wherein extracting the API call sequences further comprises determining a hash of each API name for each API call in each API call sequence.

5. The method of claim 1 further comprising, determining whether each API sequence that does not match a stored API call sequence is malware and if so, adding it to the stored API sequences.

6. The method of claim 1 wherein parsing the PE file is further based on reputation and open CTI signatures.

7. One or more non-transitory computer-readable storage media comprising instructions that are executable to cause one or more processors to:
 receive a PE file;
 parse the PE file to filter known malware;
 decompile the filtered PE file into assembly code, p-code or any combination thereof;
 extract all API call sequences from the p-code; and
  for all API call sequences that match a stored API call sequence, identify the corresponding PE file as malware
 wherein the extracting further causes the one or more processors to:
  identify all API calls and their corresponding name, that can be used by non-malware and malware executables in the assembly code, p-code or any combination thereof;
  for each identified API call:
   locate variables that are context parameters for the identified API call, wherein the context is whether the particular API call depends on one or more API calls before or after it in its correspondence API sequence;
   for the current API call, analyze forward API call data and backward API call data based on the context to locate next and previous API calls, respectively, to locate each API call to be included in a single API call sequence; and
  aggregate all the single API call sequences for each identified API call into the all API call sequences.

8. The one or more non-transitory computer-readable storage media of claim 7 wherein analyzing the backward API call data is based on p-code instruction type of the API call of the data.

9. The one or more non-transitory computer-readable storage media of claim 7 wherein the extracting further causes the one or more processors to determining a name for each API call in each API call sequence.

10. The one or more non-transitory computer-readable storage media of claim 7 wherein the extracting further causes the one or more processors to determining a hash of each API name for each API call in each API call sequence.

11. The one or more non-transitory computer-readable storage media of claim 7 where the instructions when executed further cause the one or more processors to determine whether each API sequence that does not match a stored API call sequence is malware and if so, adding it to the stored API sequences.

12. The one or more non-transitory computer-readable storage media of claim 7 where the instructions when executed further cause the one or more processors to parsing the PE file is further based on reputation and open CTI signatures.

* * * * *